US008214876B2

(12) United States Patent
Vaidyanathan

(10) Patent No.: US 8,214,876 B2
(45) Date of Patent: Jul. 3, 2012

(54) SYSTEM AND METHOD FOR STATISTICAL ANALYSIS OF BORDER GATEWAY PROTOCOL (BGP) CONFIGURATIONS

(75) Inventor: Ravichander Vaidyanathan, North Brunswick, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1062 days.

(21) Appl. No.: 11/606,687

(22) Filed: Nov. 30, 2006

(65) Prior Publication Data

US 2007/0250902 A1    Oct. 25, 2007

Related U.S. Application Data

(60) Provisional application No. 60/793,081, filed on Apr. 19, 2006.

(51) Int. Cl.
*H04L 29/06* (2006.01)
*H04L 9/32* (2006.01)
*G06F 17/00* (2006.01)
*G06F 12/14* (2006.01)
*G06F 11/30* (2006.01)
*G06F 15/173* (2006.01)

(52) U.S. Cl. ............... 726/1; 726/4; 726/11; 726/12; 726/13; 726/23; 713/153; 713/161; 713/166; 713/168; 713/188; 713/189; 709/224; 709/238

(58) Field of Classification Search ............ 726/1, 4, 726/11–13, 23; 713/153, 161, 166, 168, 713/188, 189; 709/224, 238
See application file for complete search history.

(56) References Cited

U.S. PATENT DOCUMENTS

| | | | |
|---|---|---|---|
| 6,996,062 B1* | 2/2006 | Freed et al. | 370/235 |
| 2005/0099971 A1* | 5/2005 | Droms et al. | 370/328 |
| 2005/0138413 A1* | 6/2005 | Lippmann et al. | 713/201 |
| 2005/0267928 A1* | 12/2005 | Anderson et al. | 709/200 |
| 2005/0278784 A1* | 12/2005 | Gupta et al. | 726/23 |
| 2006/0075093 A1* | 4/2006 | Frattura et al. | 709/224 |
| 2006/0123479 A1* | 6/2006 | Kumar et al. | 726/23 |
| 2006/0217923 A1* | 9/2006 | Ma et al. | 702/179 |
| 2007/0150614 A1* | 6/2007 | Ramachandran et al. | 709/238 |
| 2008/0316914 A1* | 12/2008 | Vercellone et al. | 370/216 |

* cited by examiner

*Primary Examiner* — Aravind Moorthy
(74) *Attorney, Agent, or Firm* — Philip J. Feig

(57) ABSTRACT

Routing and connectivity in the Internet is largely governed by the dynamics and configuration of the Border Gateway Protocol (BGP). A configuration analysis toolkit enables network operators to discover, analyze and diagnose their BGP configuration, policies and peering relationships. Statistical variance analysis in such a toolkit exploits the recurrence of policies in large networks for analysis. In a large network, policies that have similar functions are examined, e.g. all inbound route maps associated with customer autonomous systems. For n occurrences of similar policy P, it is possible to flag k deviant configurations, and evaluate the probability that the deviant configurations are in error. Analysis and policy visualization of implemented BGP configurations enable service providers to move from checking of low-level configuration to extracting analyzable BGP level policy information across a multitude of BGP routers in order to validate consistency of policies and operator intent across distributed BGP configurations using a flexible, customizable analysis engine.

6 Claims, 4 Drawing Sheets

*nameMatch*: 1 if match by name, 0 otherwise
*referenceMatch*: 1 if match by reference, 0 otherwise
*relationshipMatch*: 1 if match by business relationship, 0 otherwise
*asMatch*: 1 if match by neighbor AS, 0 otherwise
*matchAll*: 1 if match all criteria, 0 otherwise Two policies $P_i$ and $P_j$, are deemed similar and placed in Group $G_k$ iff the following expression evaluates to true:

if (*matchAll*)
    if (*nameMatch* && name($P_i$) != name ($P_j$)) return false;
    if (*referenceMatch* && reference($P_i$) != name ($P_j$)) return false;
    if (*relationshipMatch* && relationship($P_i$) != relationship($P_j$)) return false;
    if (*asMatch* && as($P_i$) != as($P_j$)) return false;
    return true;
else
    if (*nameMatch* && name($P_i$) = name ($P_j$)) return true;
    if (*referenceMatch* && reference($P_i$) = name ($P_j$)) return true;
    if (*relationshipMatch* && relationship($P_i$) = relationship($P_j$)) return true;
    if (*asMatch* && as($P_i$) = as($P_j$)) return true;
    return true;

FIG. 4

SYSTEM AND METHOD FOR STATISTICAL ANALYSIS OF BORDER GATEWAY PROTOCOL (BGP) CONFIGURATIONS

CROSS REFERENCE TO RELATED APPLICATION

This application claims the benefit of U.S. Provisional Patent Application No. 60/793,081, filed Apr. 19, 2006, the disclosure of which is hereby incorporated herein by reference.

FIELD OF THE INVENTION

The present invention relates generally to the field of routing and connectivity in the Internet, and specifically to the analysis and diagnosing of the Border Gateway Protocol (BGP) configuration in network systems.

BACKGROUND OF THE INVENTION

The Border Gateway Protocol (BGP) allows an autonomous system (AS) to apply diverse local policies for selecting routes and propagating reachability information to other domains. However, BGP permits autonomous systems to have conflicting policies that can lead to routing instability.

Routing and connectivity in the Internet is largely governed by the dynamics and configuration of the Border Gateway Protocol. Network operators use BGP to route traffic between autonomous systems in the Internet, and to enforce complex peering policies with their customers, peers and providers. BGP is a policy and configuration intensive protocol that lends itself to the implementation of complicated topologies and connectivity. While there is much ado about BGP policy, most network operators use manual or scripting based techniques to manage BGP configuration and implement complex administrative policies. Recent studies have shown that nearly 95% of all new prefix advertisements in the Internet routing table can be attributed to mis-configuration.

BGP configuration is difficult to implement. BGP is a flexible, policy-based routing protocol where policies are implemented by complex configurations. Configuration is not based on policies, but on mechanisms. Configuration is often implemented in response to network events. Configuration grows over time as events happen. In order to specify a single policy, a large number of parameters must be adjusted.

Analysis and policy visualization of implemented BGP configuration enable service providers to move from checking of low-level configuration to extracting analyzable BGP level policy information across a multitude of BGP routers in order to validate consistency of policies and operator intent across distributed BGP configuration using a flexible, customizable analysis engine.

The name Infer refers to a Telcordia Technologies BGP configuration analysis toolkit. The Infer configuration analysis toolkit enables network operators to discover, analyze and diagnose their BGP configuration, policies and peering relationships. Infer analysis components include variations of Invariant, Best Current Practices (BCP), Statistical Variance and Dynamic analyses. A key feature of Infer is the ability to perform policy based analysis even in the absence of an articulation of high-level policy from the network operator. The Infer toolkit can interact with external data sources such as Internet Routing Registries and BGP monitors, and can enable operators to validate the consistency of policies and operator intent across distributed BGP configuration.

While there exist toolkits for analyzing BGP configurations, there is a need for a more accurate method which relies upon statistical variance of policies to control the BGP configuration.

SUMMARY OF THE INVENTION

The present invention refers to a configuration analysis toolkit that enables network operators to discover, analyze and diagnose their BGP configuration, policies and peering relationships. One such toolkit is an Infer configuration analysis toolkit containing components which include variations of Invariant, Best Current Practices (BCP), Statistical Variance and Dynamic analyses. A key feature of Infer is the ability to perform policy based analysis even in the absence of an articulation of high-level policy from the network operator. The Infer toolkit can interact with external data sources such as Internet Routing Registries and BGP monitors, and can enable operators to validate the consistency of policies and operator intent across distributed BGP configuration.

The present invention is concerned with the Statistical Variance Analysis aspect of the toolkit. Statistical variance analysis exploits the recurrence of policies in large networks to detect anomalies in network configuration. In a large network, policies that have similar functions are examined, e.g. all inbound route maps associated with BGP neighbors that represent customer Autonomous Systems. For n occurrences of similar policy P, it is possible to flag k deviant configurations, and evaluate the probability that the deviant configurations are in error.

However, configuration policies that are deployed in large networks are often customized, making them difficult to compare. Infer decomposes policies into building blocks (termed configlets) and then analyzes the existence, completeness and sequencing of these building blocks across "similar" policies.

A configlet is defined as a set of configuration statements that together represent an element of a policy (or a micro-policy). Multiple configlets could be sequenced to form a larger policy. For example, route filtering policy towards customers may have the following configlets—martian filters, setting local preference, and setting community attributes.

Variance analysis of BGP Peer Group configurations for each AS evaluates the common peer group configuration options and mechanisms and flags the deviant peer group configurations. Variance analysis of BGP routing policies analyses prefix-lists, access-lists, community-lists, route-maps and AS Path access lists for statistical variances. The Infer toolkit also measures the variance of global BGP configuration options, measures the variance of BGP peer configurations, and leverages business relationship knowledge for variance analysis Implementations of this technique have been developed for the BGP protocol configuration and filtering policy associated with BGP. However, the implementations are applicable in general to the broader network/router configuration space.

The present invention will be more clearly understood when the following description is read in conjunction with the accompanying drawings.

BRIEF DESCRIPTION OF THE DRAWINGS

FIG. 4 is a grouping algorithm including the parameters used to tune the algorithm.

DETAILED DESCRIPTION OF THE INVENTION

Figure 1:
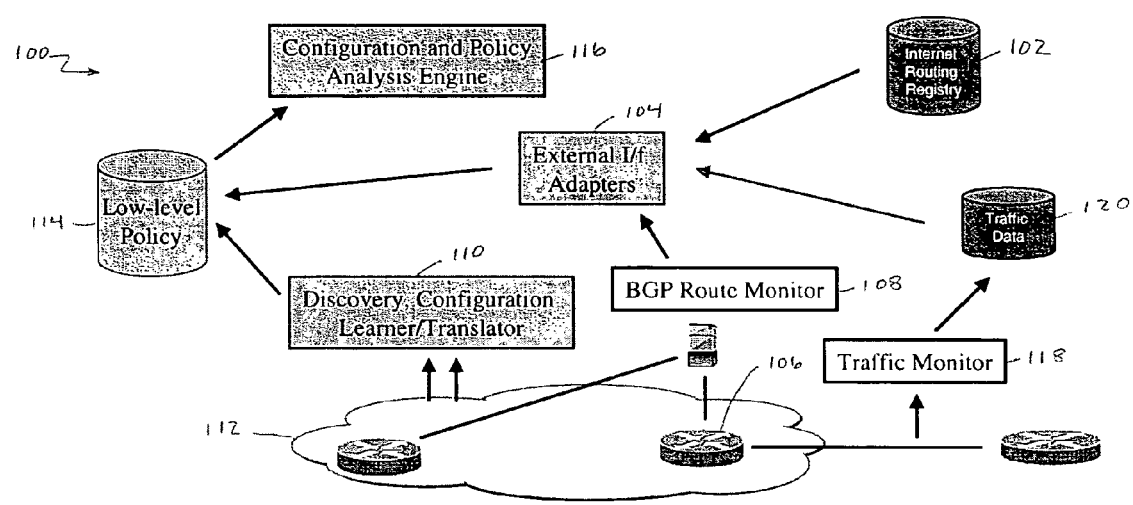
FIG. 1 is a schematic diagram of a high level representation of the Infer toolkit.

Referring now to the figures and to FIG. 1 in particular, there is shown a schematic diagram of a high level representation 100 of the Infer toolkit.

An Internet Routing Registry (IRR) 102 provides routing information to an External Interface Adapter 104. Traffic into router 106 is monitored and a BGP Route Monitor 108 provides the traffic information to the External Interface Adapter 104. Discovery, Configuration, Learner/Translator 110 discovers information from the network elements 112 and normalizes the configuration statements into a low level policy representation. This low-level policy representation is stored in Low-level Policy storage 114. The output of the External Interface Adapter 104 is also provided as in input to the Low-level Policy storage 114. The Configuration and Policy Analysis Engine 116 performs the various Infer analysis techniques, to be described below, on the data stored in the Low-level Policy storage 114. The External Interface Adapter 104, Discovery, Configuration, Learner/Translator 110, Low-level Policy storage 114, and Configuration and Policy Analysis Engine 116 comprise the Infer components.

Traffic to and from the network elements 112 is monitored by traffic monitor and passed along to traffic data storage 120. The stored traffic data is provided to the External Interface Adapter 104.

Generally, the toolkit gathers distributed BGP configurations, parses and normalizes them into vendor independent, low-level policy representations. Analysis operations are performed on the low-level policy representations.

The toolkit diagnoses BGP configuration and analyzes the configuration for correctness, best current practices, and statistical deviations from the intended configuration.

In addition, Infer can perform analysis of inter-AS relationships. The policy representations are used to analyze peering relationships, flag peering abuses, and can be correlated with traffic measurements and routing advertisements.

Derived policies are provided to the operator and potential cases of violated policies or intent are highlighted.

Figure 2:
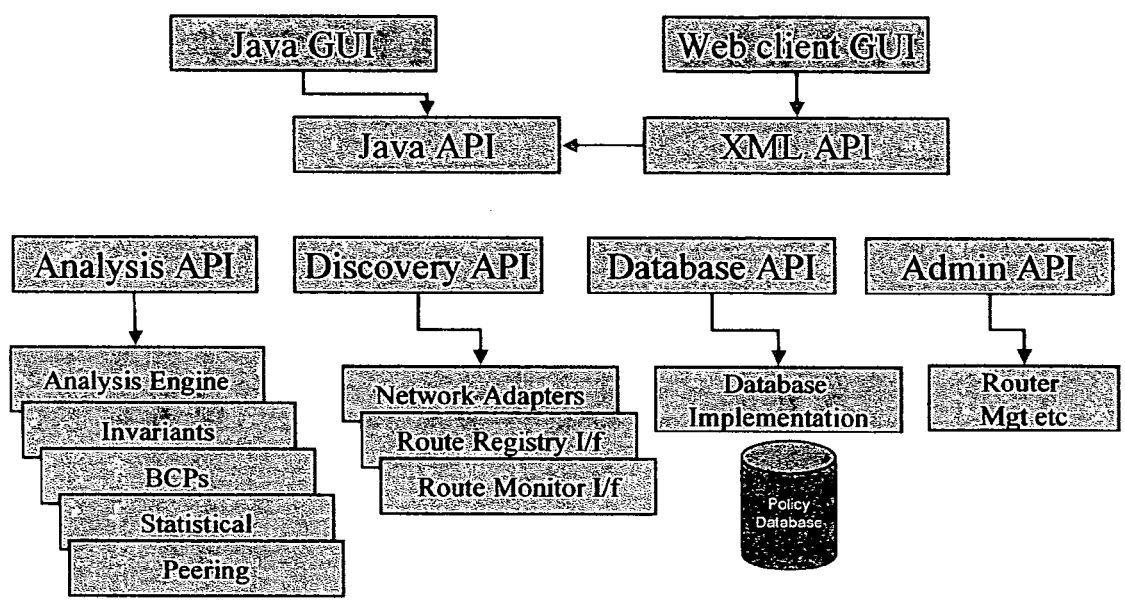
FIG. 2 is a schematic diagram of Infer software architecture.

The system and software architecture shown in FIG. 2 are a modular, extensible architecture having the ability to extend Analysis, Discovery and Database modules. The architecture allows plugging in of new validations and the like by defining additional Java API and/or implementations. Moreover, the system is standards-based, containing granular XML interfaces which can integrate into Service Provider process flows. For instance, it can be invoked in an OSS flow before provisioning network elements. The system thus allows for proactive error detection and policy validation. The granularity of the API allows for invocation of specific functions or bulk invocations depending on the need.

Figure 3:
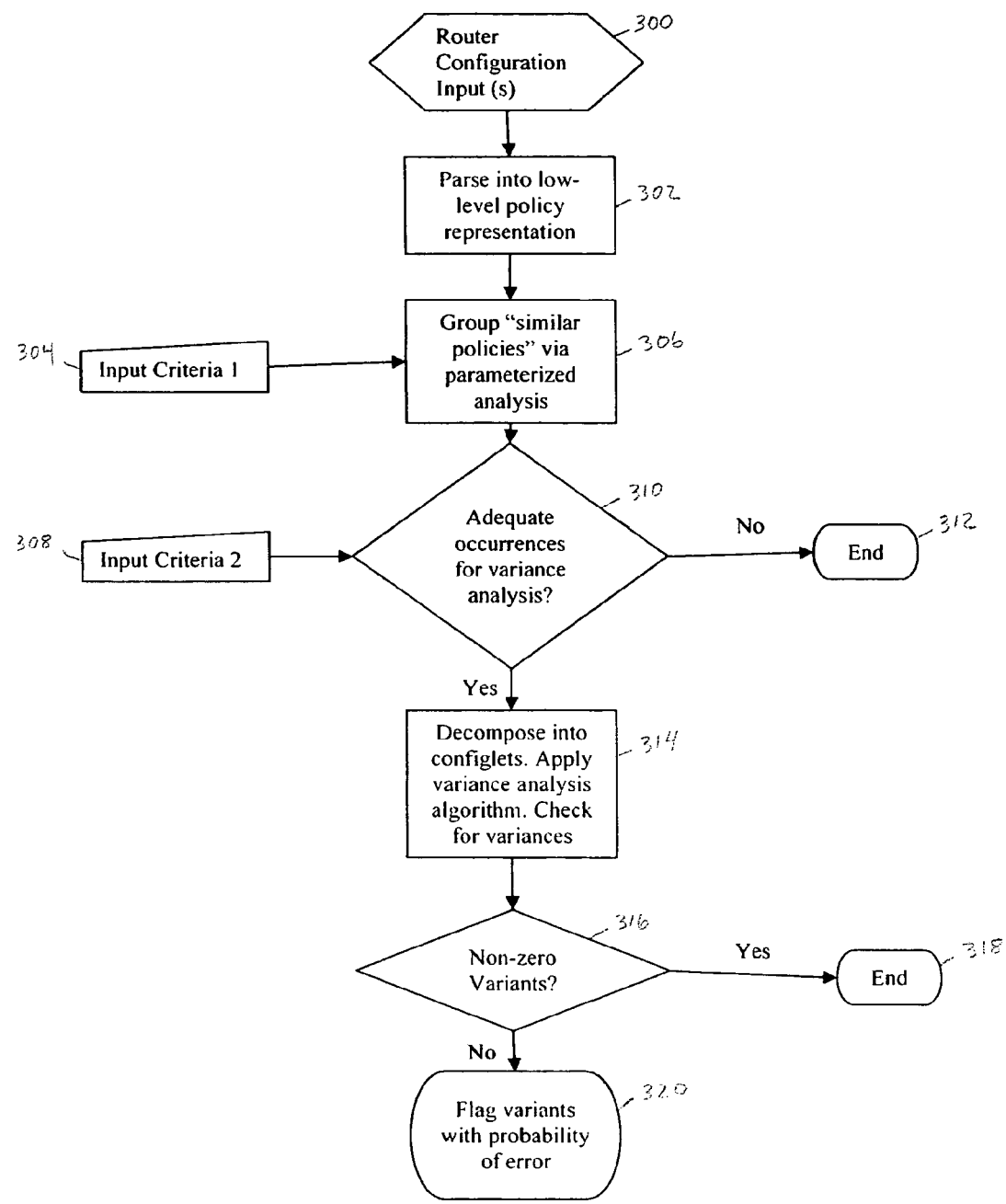
FIG. 3 is a flow chart of the Statistical Variance Analysis component of the invention for router configuration.

FIG. 3 is a flow chart of the Statistical Variance Analysis component of the invention for router configuration. The inputs 300 to the Infer toolkit are router configuration files or partial snippets of router configuration. The parsing module normalizes router configuration commands into a low level policy representation 302. Statistical variance analysis uses this low level policy representation as input.

A first set of Input Criteria 304 is used for grouping together similar policies 306 within an AS, the policies being tunable as described above. One or more policies are placed into a group G, if they are deemed to be "similar". The grouping algorithm, as well as the parameters used to tune the policies, is shown in FIG. 4.

At the end of this process, all policies are placed into a finite number of groups, where each group $G_k$ may have one or more policies.

A second set of Input Criteria 308 is used for determining if a group of similar policies $G_k$ is valid for statistical variance analysis 310. If there are insufficient similarities the process ends 312.

If there are sufficient similarities, for each policy $P_i$ in group $G_k$, the policy is decomposed into configlets $C_n$ 314, where each configlet represents a single policy element. A policy $P_i$ can then be represented by an ordered sequence of configlets.

A check is made whether there are non-zero variants of a similar policy 316. If there are non-zero-variants of a similar policy, the process ends 318. If there are no non-zero variants of a similar policy, variants with probability of error are flagged 320.

Referring to the algorithm in FIG. 4, another key innovation in Infer is the ability to characterize "similar" policies. Infer allows a parameterized grouping of similar policies, by means of the following criteria:

Policy name: Two or more policies are considered similar, if they are referenced by the same name and or of the same type, for example, all route-maps of name "INBOUND_CUSTOMER".

Policy reference: Two or more policies are considered similar, if they are referenced in the same way, for example, all route-maps that are referenced in external BGP neighbor configuration, in the outbound direction.

Business relationship: An additional criterion on reference, two or more policies are considered similar only if they are referenced in the same way for the same business relationship, for example, all route-maps that are referenced in external BGP neighbor configuration, in the outbound direction and for business relationships of Peer.

AS Number: An additional criteria on reference, two or more policies are considered similar only if they are referenced in the same way for the same neighbor Autonomous System (AS) number, for example, all route-maps that are referenced in external BGP neighbor configuration, in the outbound direction and for neighbor AS of 116.

Match All/Match Any: This allows for using a very restrictive Match All criteria type grouping for similar policies, or alternatively a loose Match Any grouping of the above criteria.

Statistical Variance Analysis Algorithm

As described above in connection with the flow chart in FIG. 3, the statistical variance analysis algorithm will now be described below. The input to the Infer toolkit is router configuration files or partial snippets of router configuration. The parsing module normalizes router configuration commands into a low level policy representation. Statistical variance analysis uses this low level policy representation as input.

1. Group "similar" policies: The criteria used for grouping together similar policies within an AS can be tuned as described above. One or more policies are placed into a group G, if they are deemed to be "similar". The grouping algorithm, as well as the parameters used to tune the algorithm, is shown in FIG. 4.

At the end of this process, all policies are placed into a finite number of groups, where each group $G_k$ may have one or more policies.

2. Filter Groups by number of occurrences: An additional criteria used for determining if a Group of similar policies $G_k$ is valid for statistical variance analysis is the minOccurs parameter.

A group $G_k$ is considered valid for statistical variance analysis iff:

Number of policies $\in G_k$ >=minOccurs

At the end of this process, a limited number of groups $G_k$, with an adequate number of similar policies remain for statistical variance analysis.

3. Decompose into configlets: For each policy $P_i$ in group $G_k$, decompose the policy into configlets $C_n$, where each configlet represents a single policy element. A policy $P_i$ can then be represented by an ordered sequence of configlets.

$P_i \equiv \{C_1, C_2, \ldots, C_n\}$

4. Variance analysis: Policies $P_i$ and $P_j$ are equivalent iff:

For every $C_n \in P_i$, there exists a corresponding configlet $C_m \in P_j$. If $P_i$ is a sequence sensitive policy (i.e. the ordering of configlets matters), then n=m for $P_i$ and $P_j$ to be equivalent.

Else, $P_i$ and $P_j$ are considered to be variants of a similar policy. For each group $G_k$, the equivalent member policies P are placed into buckets B. At the end of this process we have t buckets, where 1<=t<=(Number of policies $\in G_k$)

5. Probability of Error: We now compute the probability of error from statistical variance analysis as follows:

Let there be t buckets, and let size($B_i$) represent the size of the $i^{th}$ bucket. Then the probability that a policy $P \in B_i$ is in error is represented by the following:

$\text{prob}_{err} = 1 - \text{size}(B_i)/\max\lfloor \text{size}(B_{k,1 \leq k \leq t}) \rfloor$ Those policies P having an error probability greater than or equal to a predetermined value are flagged for identification by an operator.

While there has been described and illustrated a system and method for statistical analysis of border gateway protocol configurations, it will be apparent to those skilled in the art that variations and modifications are possible without deviating from the spirit and broad teachings of the present invention which shall be limited solely by the scope of the claims appended hereto.

What is claimed is:

1. A method for statistical analysis of Border Gateway Protocol configurations comprising the steps of:
   obtaining router configuration data from multiple network elements forming an autonomous system;
   parsing the router configuration data into low level policy representations;
   inputting a first set of criteria;
   grouping together a plurality of similar policies within an autonomous system;
   inputting a second set of criteria;
   detecting anomalies in network configurations by determining if a group of similar policies is valid for statistical variance analysis;
   if there are insufficient similarities in the statistical variance analysis the method ends;
   if there are sufficient similarities in the statistical variance analysis, decomposing the policies into configlets;
   if there are non-zero variants in the statistical variance analysis, the method ends; and
   if there are no non-zero variants in the statistical variance analysis, variants with probabilities of error are flagged.

2. A method as set forth in claim 1 wherein said obtaining router configuration data is achieved by inputting router configuration data.

3. A method as set forth in claim 1, wherein said obtaining router configuration data is achieved by discovering router configuration data.

4. A method for statistical analysis of network/router configurations comprising the steps of:
   obtaining network/router configuration data from multiple network elements forming an autonomous system;
   parsing the configuration data into low level policy representations;
   inputting a first set of criteria;
   grouping together a plurality of similar policies within an autonomous system;
   inputting a second set of criteria;
   detecting anomalies in network configurations by determining if a group of similar policies is valid for statistical variance analysis;
   if there are insufficient similarities in the statistical variance analysis the method ends;
   if there are sufficient similarities in the statistical variance analysis, decomposing the policies into configlets;
   if there are non-zero variants in the statistical variance analysis, the method ends; and
   if there are no non-zero variants in the statistical variance analysis, variants with probabilities of error are flagged.

5. A method as set forth in claim 4 wherein said obtaining network/router configuration data is achieved by inputting router configuration data.

6. A method as set forth in claim 4, wherein said obtaining network/router configuration data is achieved by discovering router configuration data.

* * * * *